(No Model.)

H. C. ADAMS.
INSECT POWDER DUSTER.

No. 535,439. Patented Mar. 12, 1895.

WITNESSES:
N. M. Borst.
Chas. W. Marvin.

INVENTOR
Herbert C. Adams.

BY
Smith & Denison
ATTORNEYS.

UNITED STATES PATENT OFFICE.

HERBERT C. ADAMS, OF MEXICO, NEW YORK.

INSECT-POWDER DUSTER.

SPECIFICATION forming part of Letters Patent No. 535,439, dated March 12, 1895.

Application filed February 21, 1894. Serial No. 500,963. (No model.)

*To all whom it may concern:*

Be it known that I, HERBERT C. ADAMS, of Mexico, in the county of Oswego, in the State of New York, have invented new and useful Improvements in Insect-Powder Dusters, of which the following, taken in connection with the accompanying drawings, is a full, clear, and exact description.

This invention relates to insect powder dusters.

My object is to produce a device for sifting or dusting insect powder, paris green or other poisonous material upon plants, for the purpose of either killing or poisoning the insect; cheap and durable in its construction and of great utility; and to that end my invention consists in the several new and novel features and combination of parts hereinafter described and which are specifically set forth in the claim hereunto annexed. It is constructed as follows, reference being had to the accompanying drawings, in which—

Figure 1:
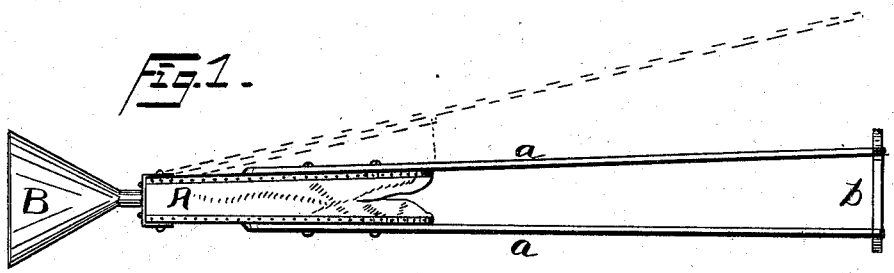
Figure 2:
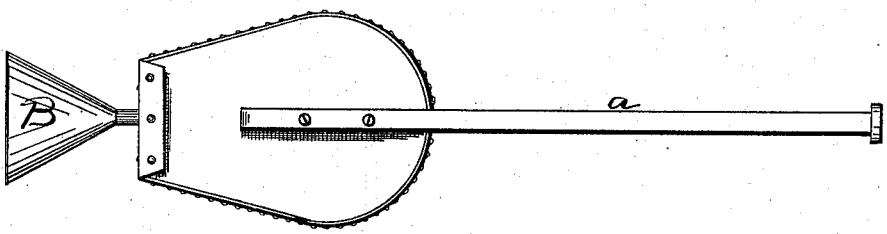
Figure 3:
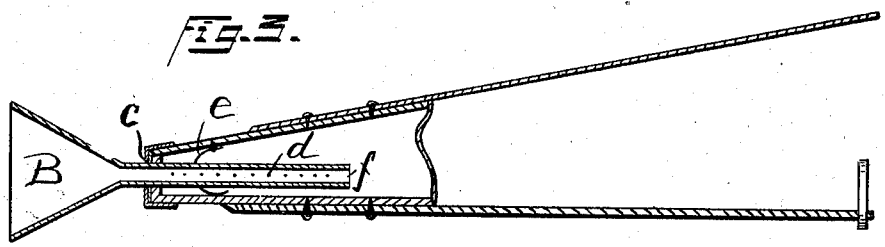
Figure 4:
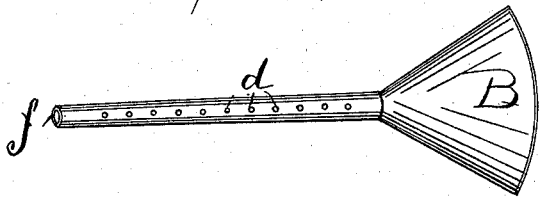

Figure 1, shows a side view of the device complete, in a collapsed position, and showing it extended in dotted lines. Fig. 2, is a top plan view thereof. Fig. 3, is a longitudinal vertical section of the device shown in Fig. 1, in its extended position. Fig. 4, is a view of the chute complete, detached.

—A— is a pair of bellows, constructed in any form desired, provided with handles —a— by which it is operated, and having a strap —b— at their ends by which they are held together in a collapsed position when not in use.

—B— is a funnel-shaped chute constructed substantially as shown, having its small end inserted through an opening —c— in the front end of the bellows and extending a considerable distance into the bellows, as shown in Fig. 3, and for the purposes hereinafter specified. The small end of said chute and that part which is inclosed by the bellows is perforated as shown at —d—.

—e— is a strap spring interposed between the adjacent faces of the bellows and serves the purpose of expanding the bellows automatically, and also as an agitator. I do not, however, confine myself to this strap spring shown, as it will be evident that a coil spring may be inserted which will perform the same operation, or attain the same result.

To operate the device I first turn the bellows up so that the powder may be inserted through the funnel, allowing it to pass down into the interior of the bellows. Then, by operating the handles, the insect powder is forced in minute quantities into the chute through the open end —f— and through the perforations —d—, and then as it is forced out by the wind within the bellows it is allowed to separate itself as soon as it passes into the enlarged portion of the chute, from whence it is disseminated upon the plant.

It will be observed that, by inserting the small end of the chute into the bellows, as shown in Fig. 3, the action of the air will tend to force the powder out in small quantities, whereas, if the chute were simply inserted into the end of the bellows, it would be forced out in large quantities, which would defeat the purposes for which it is intended.

Having described my invention, what I claim, and desire to secure by Letters Patent, is—

The insect-powder duster consisting of the bellows having handles, one provided at its outer end with a strap adapted to engage the other handle and hold the bellows collapsed, the funnel-shaped chute having its tubular foraminous portion extending into the bellows, and the spring arranged within said bellows, one end of which is attached to one side thereof, and resting near its other end, upon the opposite side of the bellows and said end adapted to serve as an agitator for the powder therein, substantially as described.

In witness whereof I have hereunto set my hand this 5th day of February, 1894.

HERBERT C. ADAMS.

In presence of—
C. W. SMITH,
HOWARD P. DENISON.